(12) United States Patent
Niewiadomski et al.

(10) Patent No.: US 10,632,803 B2
(45) Date of Patent: Apr. 28, 2020

(54) HITCH ASSIST SYSTEM

(71) Applicant: Ford Global Technologies, LLC, Dearborn, MI (US)

(72) Inventors: Luke Niewiadomski, Dearbórn, MI (US); Chen Zhang, San Jose, CA (US); Bruno Sielly Jales Costa, Sunnyvale, CA (US); Nikhil Nagraj Rao, Sunnyvale, CA (US); Vidya Nariyambut Murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/999,125

(22) Filed: Aug. 17, 2018

(65) Prior Publication Data

US 2020/0055356 A1    Feb. 20, 2020

(51) Int. Cl.
| | |
|---|---|
| *B60D 1/06* | (2006.01) |
| *B60D 1/36* | (2006.01) |
| *B60R 1/00* | (2006.01) |
| *B60R 11/04* | (2006.01) |
| *B62D 15/02* | (2006.01) |
| *B62D 5/04* | (2006.01) |

(52) U.S. Cl.
CPC ............... *B60D 1/36* (2013.01); *B60R 1/003* (2013.01); *B60R 11/04* (2013.01); *B62D 15/025* (2013.01); *B60D 1/06* (2013.01); *B60R 2300/808* (2013.01); *B62D 5/0463* (2013.01)

(58) Field of Classification Search
CPC .. B60D 1/36; B60D 1/06; B60R 1/003; B60R 11/04; B60R 2300/808; B62D 15/025; B62D 5/0463
See application file for complete search history.

(56) References Cited

U.S. PATENT DOCUMENTS

| | | | |
|---|---|---|---|
| 6,480,104 B1 | 11/2002 | Wall et al. | |
| 6,970,184 B2 | 11/2005 | Hirama et al. | |
| 7,171,769 B2 | 2/2007 | Schultz et al. | |
| 9,102,271 B2 | 8/2015 | Trombley et al. | |
| 9,108,598 B2 | 8/2015 | Headley | |
| 9,499,018 B2 | 11/2016 | Gehrke et al. | |
| 2012/0283909 A1 | 11/2012 | Dix | |
| 2014/0012465 A1 | 1/2014 | Shank et al. | |
| 2016/0075281 A1 | 3/2016 | Singh et al. | |
| 2016/0272024 A1 | 9/2016 | Bochenek et al. | |
| 2019/0166338 A1* | 5/2019 | Greenwood | B60Q 1/305 |
| 2019/0210418 A1* | 7/2019 | Hall | B60W 20/10 |
| 2019/0389260 A1* | 12/2019 | Niewiadomski | B60D 1/36 |
| 2019/0389261 A1* | 12/2019 | Zhang | B60Q 9/00 |
| 2019/0389262 A1* | 12/2019 | Niewiadomski | B62D 15/025 |

FOREIGN PATENT DOCUMENTS

EP    2682329 A1    1/2014

* cited by examiner

*Primary Examiner* — Jacob D Knutson
*Assistant Examiner* — Marlon A Arce
(74) *Attorney, Agent, or Firm* — Raymond Coppiellie; Price Heneveld LLP

(57) ABSTRACT

A hitch assist system is provided herein that includes a sensing system configured to detect a trailer proximate a vehicle. The hitch assist system also includes a controller for detecting a coupler of the trailer; determining a trailer-heading direction-based on a coupler orientation; and determining a path for aligning a hitch assembly on the vehicle with a coupler on the trailer based on the trailer-heading direction.

16 Claims, 16 Drawing Sheets

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes a sensing system configured to detect a trailer proximate a vehicle. The hitch assist system further includes a controller detecting a coupler of the trailer; determining a trailer-heading direction based on the coupler orientation; and determining a path for aligning a hitch assembly on the vehicle with the coupler on the trailer based on the trailer-heading direction.

According to some aspects of the present disclosure, a method of estimating a trailer orientation is provided herein. The method includes capturing rear-vehicle images. The method also includes extracting trailer and ground features from the captured images. The method further includes computing vehicle motion displacement based on optical flow of the ground features. The method additionally includes estimating a height of each trailer feature based on vehicle motion displacement and optical flow of the trailer features. Lastly, the method includes determining a trailer-heading direction based on at least a portion of the trailer feature.

According to some aspects of the present disclosure, a hitch assist system is provided herein. The hitch assist system includes an imager for capturing rear-vehicle images. The hitch assist system further includes a controller configured to extract ground features and potential trailer features from the captured images; compute vehicle motion displacement based on optical flow of the ground features; estimate a height of each potential trailer feature based on vehicle motion displacement and optical flow of the potential trailer features; classify the potential trailer features as on-trailer or off-trailer; and determine a final trailer-heading direction of a trailer based on the potential trailer features classified as on-trailer.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
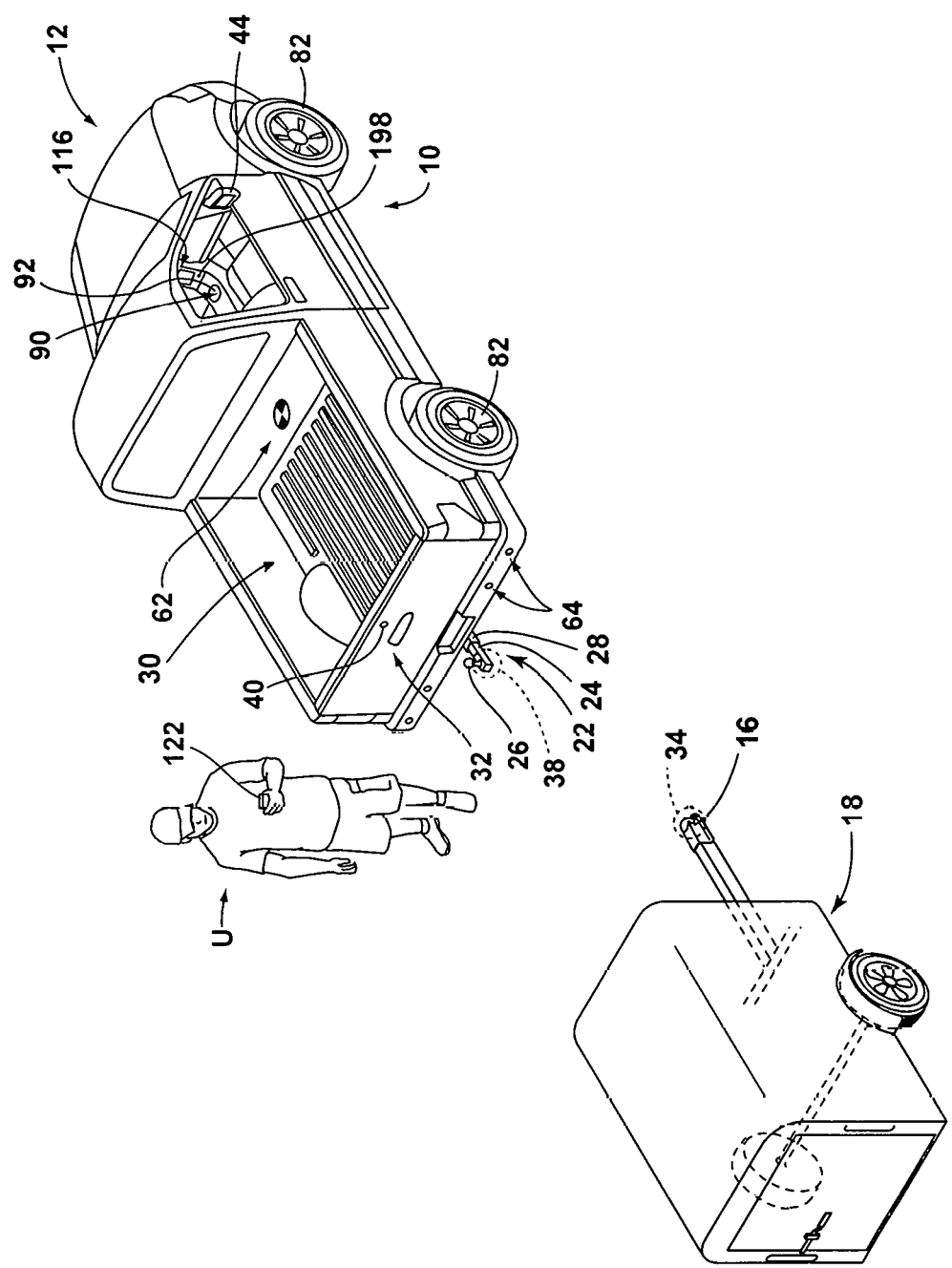
FIG. 1 is a top perspective view of a vehicle and a trailer, the vehicle being equipped with a hitch assistance system (also referred to as a "hitch assist" system), according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or endpoint referred to. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

The following disclosure describes a hitch assist system for a vehicle. The hitch assist system is provided herein that includes a sensing system configured to detect a trailer proximate a vehicle. The hitch assist system also includes a controller for detecting a coupler of the trailer; determining a trailer-heading direction based on a coupler orientation; and determining a path for aligning a hitch assembly on the vehicle with a coupler on the trailer based on the trailer-heading direction. In some instances, the controller may determine an initial trailer-heading direction through one or more proximity sensors when the trailer is separated from the vehicle by a distance greater than a threshold range and may determine a final trailer-heading direction through one or more imagers when the vehicle is equal to and disposed within the threshold range from the trailer.

Figure 2:
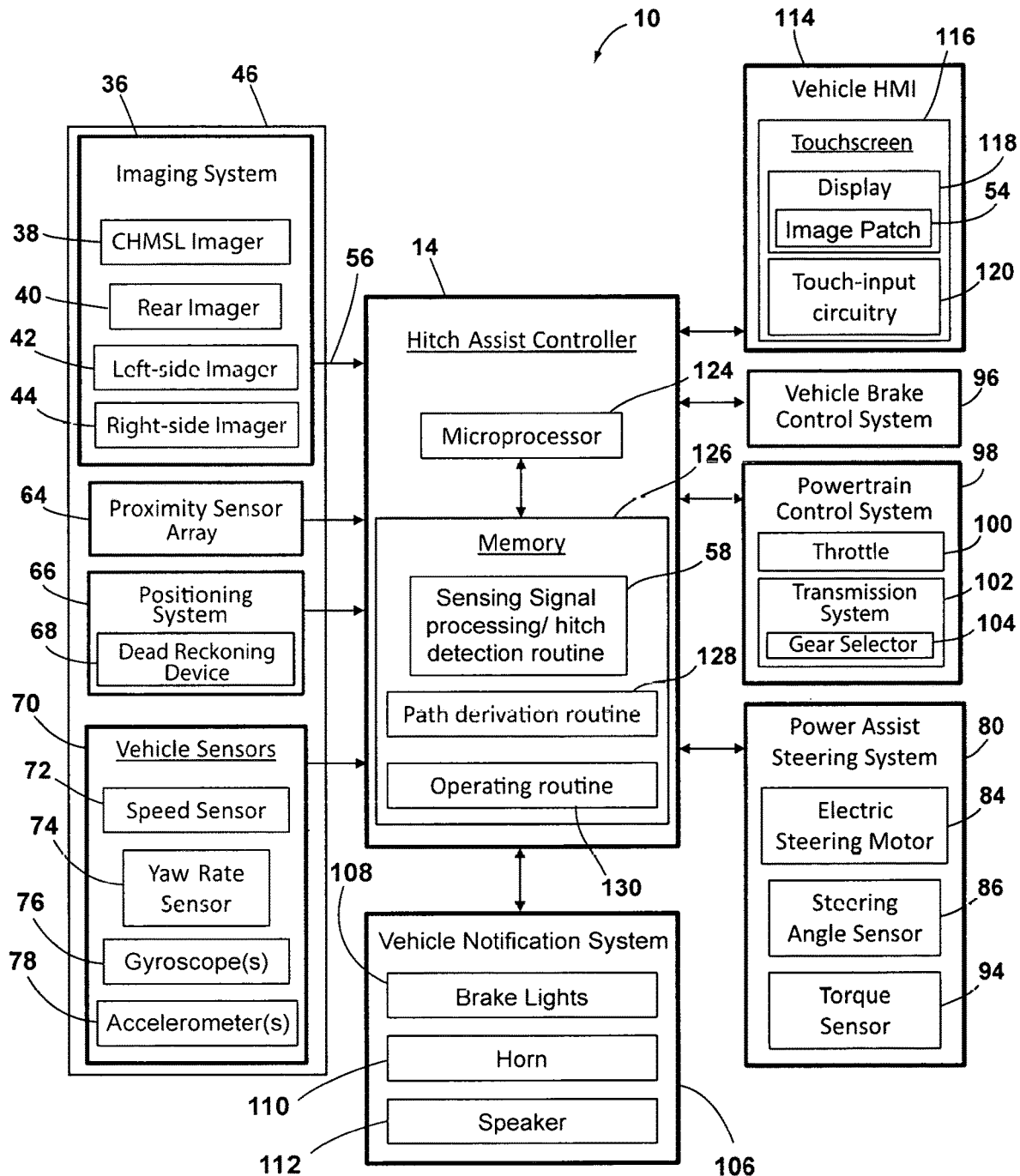
FIG. 2 is a block diagram illustrating various components of the hitch assist system, according to some examples.

Referring to FIGS. 1 and 2, reference numeral 10 designates a hitch assistance system (also referred to as a "hitch assist" system) for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. In some examples, the ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a hitch coupler 16 in the form of a coupler ball socket 34 that is provided at a terminal end portion of the trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a boat trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 48, 50, 52a, 52b, FIG. 5) defined by the image-capturing optics. In some instances, the one or more imagers 38, 40, 42, 44 may derive an image patch 54 from multiple image frames that may be shown on a display 118. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image/signal processing routine 58, or in another dedicated image/signal processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

In some examples, the use of two images including the same object can be used to determine a location of the object relative to the two imagers 38, 40, 42, and/or 44, given a known spatial relationship between the imagers 38, 40, 42, 44 through projective geometry of the imagers 38, 40, 42, 44. In this respect, the image/signal processing routine 58 can use known programming and/or functionality to identify an object within the image data 56 from the various imagers 38, 40, 42, 44 within the imaging system 36. The image/signal processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12 in a manner similar to that which is described in commonly assigned U.S. patent application Ser. No. 15/708,427, filed Sep. 19, 2017, and entitled "HITCH ASSIST SYSTEM WITH HITCH COUPLER IDENTIFICATION FEATURE AND HITCH COUPLER HEIGHT ESTIMATION," now U.S. Pat. No. 10,363,874, the entire disclosure of which is incorporated by reference herein.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (radar) sensor, a sound navigation and ranging (SONAR) sensor, a light detection and ranging (LIDAR) sensor, a vision-based sensor, and/or any other type of sensor known in the art.

Figure 3:
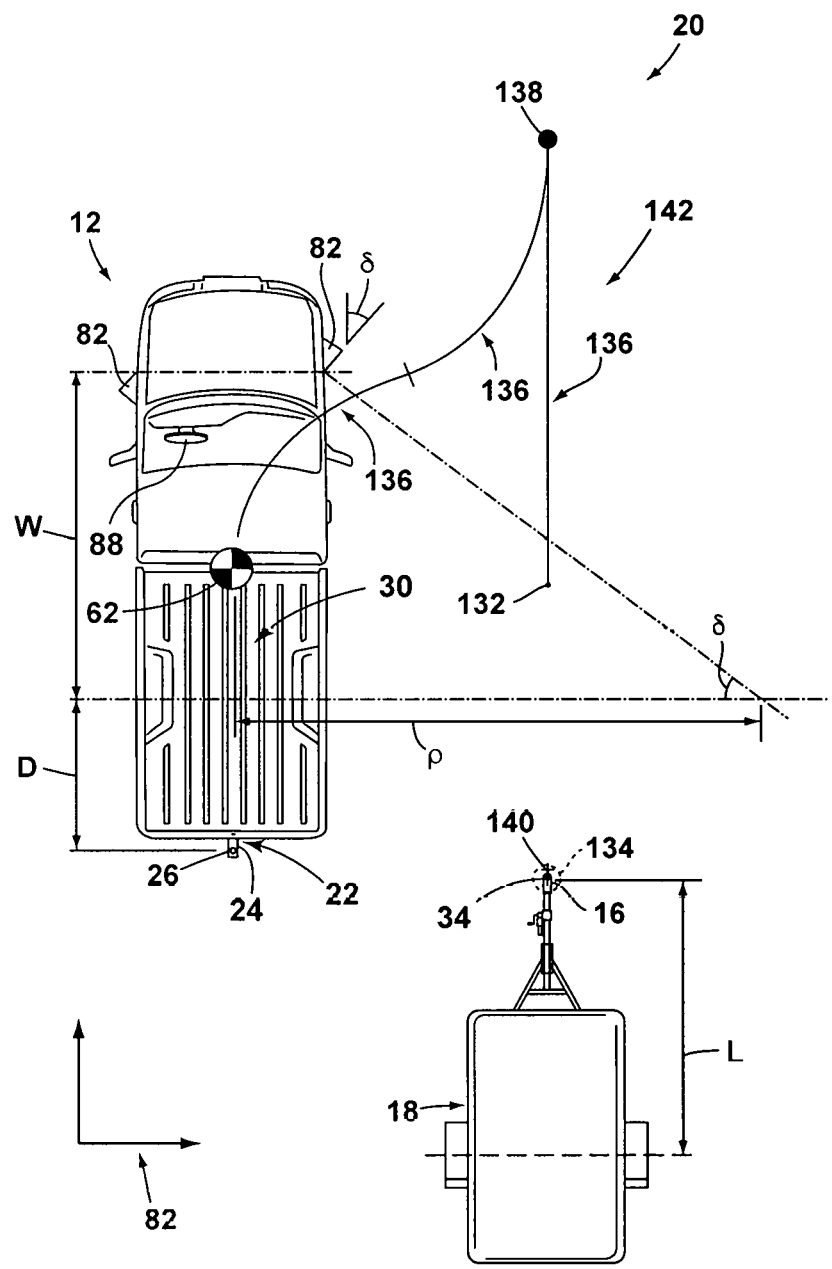
FIG. 3 is an overhead schematic view of the vehicle during a step of the alignment sequence with the trailer, according to some examples.
Figure 4:
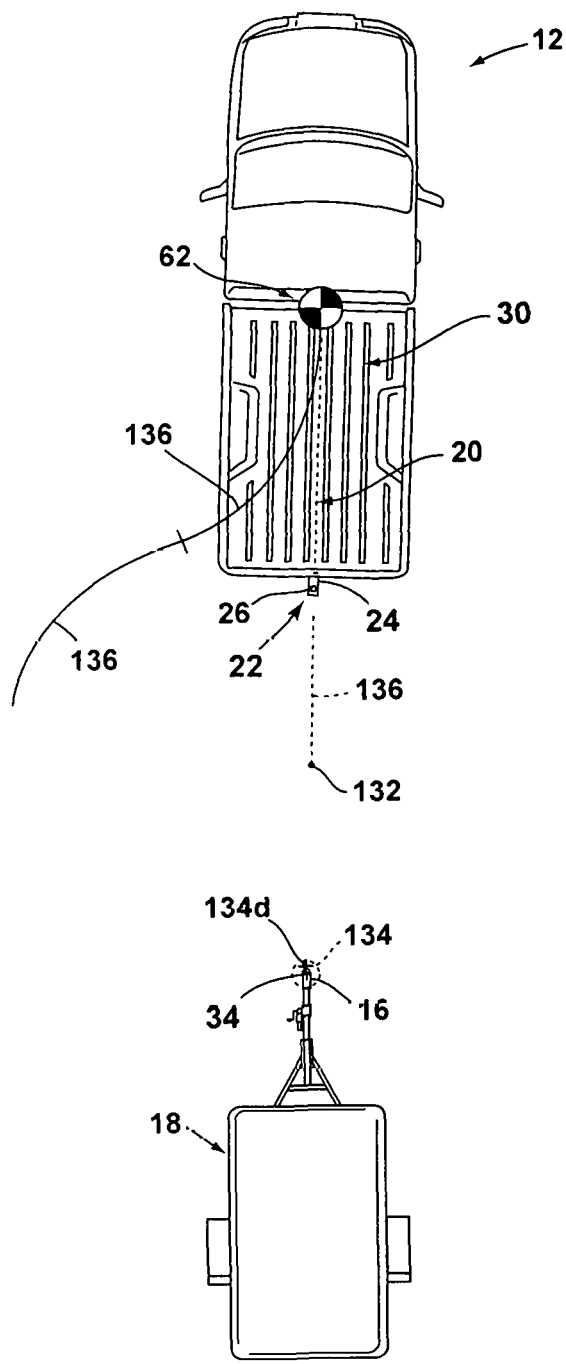
FIG. 4 is an overhead schematic view of the vehicle during a subsequent step of the alignment sequence with the trailer, according to some examples.

Referring still to FIGS. 1 and 2, a positioning system 66, which may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle $\delta$ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle $\delta$ based on a steering command generated by the controller 14, whereby the steering angle $\delta$ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality. However, as provided in more detail below, the hitch assist system 10 may continue one or more functions/operations while discontinuing the autonomous steering of the vehicle.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of the vehicle transmission system 102 through one or more gears of the transmission system 102. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle notification system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle notification system 106 may communicate with a user-input device, such as a human-machine interface (HMI) 114 of the vehicle 12. The HMI 114 may include a touchscreen 116, or other user-input device, such as a navigation and/or entertainment display 118 mounted within a cockpit module, an instrument cluster, and/or any other location within the vehicle 12, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may communicate via wired and/or wireless communication with some instances of the HMI 114 and/or with one or more handheld or portable devices 122 (FIG. 1), which may additionally and/or alternatively be configured as the user-input device. The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image/signal processing routine 58, a hitch detection routine, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image/signal processing routine 58 may be carried out by a dedicated processor, for example, within a stand-alone imaging system 36 for the vehicle 12 that can output the results of its image/signal processing to other components and systems of vehicle 12, including the microprocessor 124. Further, any system, computer, processor, or the like that completes image/signal processing functionality, such as that described herein, may be referred to herein as an "image/signal processor" regardless of other functionality it may also implement (including simultaneously with executing the image/signal processing routine 58).

In some examples, the image/signal processing routine 58 can be programmed or otherwise configured to locate the coupler 16 within the image data 56. In some instances, the image/signal processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly assigned U.S. Pat. No. 9,102,271, entitled "TRAILER MONITORING SYSTEM AND METHOD," the entire disclosure of which is incorporated by reference herein. In such examples, the image/signal processing routine 58 may be programmed with identifying characteristics of the marker for location in the image data 56, as well as the positioning of the coupler 16 relative to such a marker so that the location of the coupler 16 can be determined based on the marker location. Additionally or alternatively, the controller 14 may seek confirmation of the coupler 16, via a prompt on the touchscreen 116 and/or the portable device 122. If the coupler 16 determination is not confirmed, further image/signal processing may be provided, or user-adjustment of the position 134 of the coupler 16 may be facilitated, either using the touchscreen 116 or another input to allow the user U to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user U can visually determine the position 134 of the coupler 16 within an image presented on HMI 114 and can provide a touch input in a manner similar to that which is described in co-pending, commonly-assigned U.S. patent application. Ser. No. 15/583,014, filed May 1, 2017, and entitled "SYSTEM TO AUTOMATE HITCHING A TRAILER," now U.S. Pat. No. 10,266,023, the entire disclosure of which is incorporated by reference herein. The image/signal processing routine 58 can then correlate the location of the touch input with the coordinate system applied to the image patch 54.

As shown in FIGS. 3-6, in some exemplary instances of the hitch assist system 10, the image/signal processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image/signal processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis 146 of vehicle 12. Once the positioning $D_c$, $\alpha_c$ of the coupler 16 has been determined and, optionally, confirmed by the user U, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle δ can be used to determine a corresponding turning radius ρ for the vehicle 12 according to the equation:

$$\rho = \frac{1}{W \tan \delta}, \quad (1)$$

in which the wheelbase W is fixed and the steering angle δ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the projected path 20, including the endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle δ, as dictated by the path 20, depending on the position of the vehicle 12 therealong.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path 20 in which a vehicle condition is changed. The vehicle conditions include, but are not limited to, a change in speed, a change in steering angle δ, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, an inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle δ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $\alpha_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
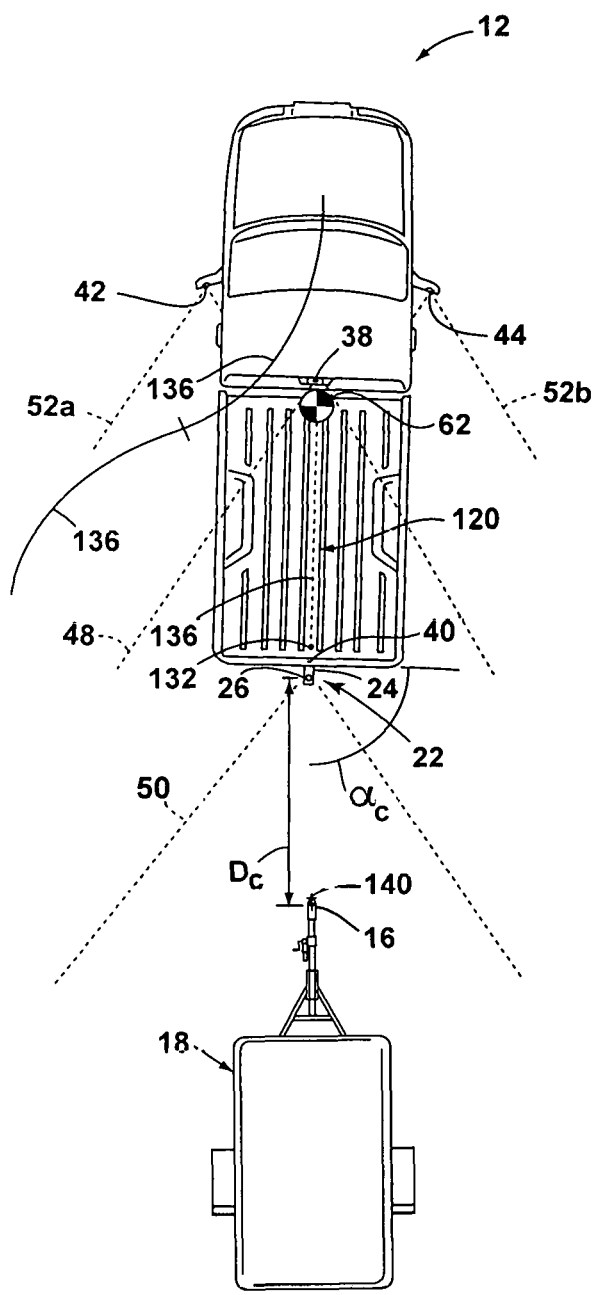
FIG. 5 is an overhead schematic view of the vehicle during a subsequent step of the alignment sequence with the trailer, according to some examples.
Figure 6:
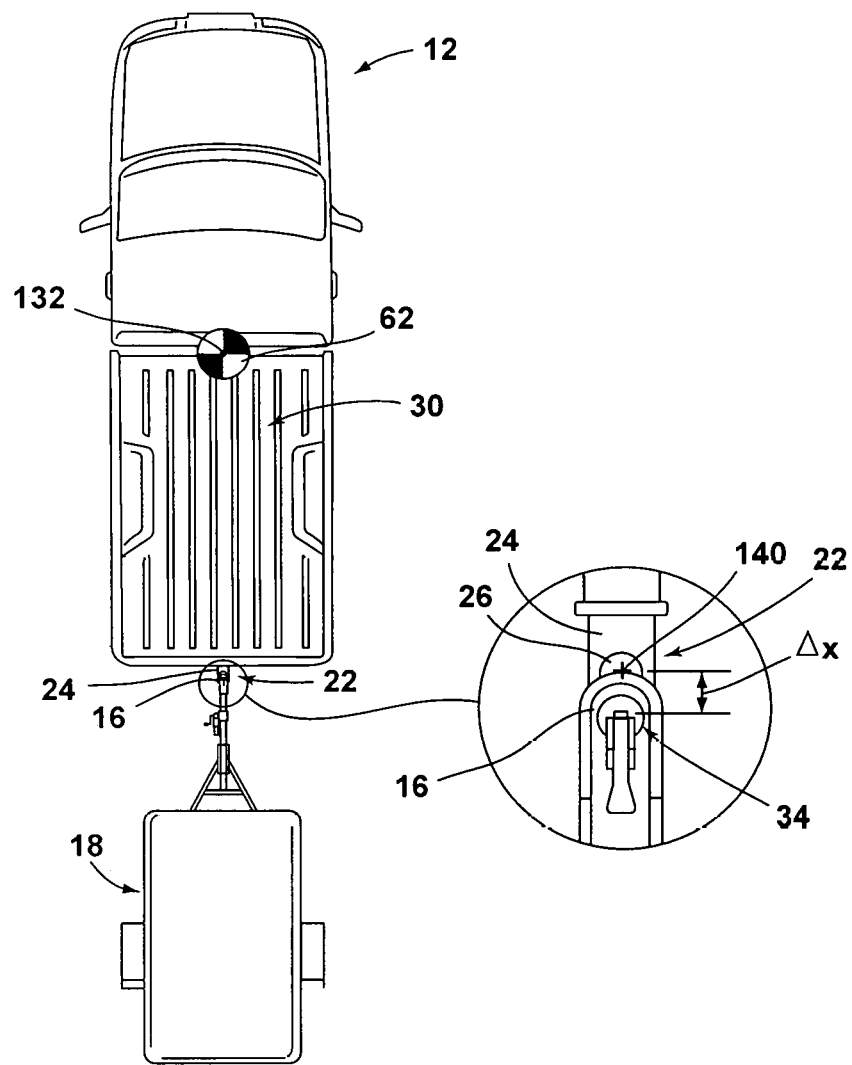
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_b$ of the hitch ball 26, which represents the vertical distance by which coupler 16 will be lowered to engage with hitch ball 26. The determined trajectory is then used to relate the vertical distance with a corresponding horizontal distance Δx of coupler 16 movement in the driving direction that results from the vertical distance. This horizontal distance Δx can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image/signal processing routine 58 monitors the positioning $D_c$, $\alpha_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the initial endpoint 132 can be refined or should be updated (due to, for example, improved height $H_c$, distance $D_c$, or offset angle $\alpha_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $\delta_{max}$, while tracking the position $D_c$, $\alpha_c$ of the coupler 16 to converge the known relative position of the hitch ball 26 to the desired final endpoint 140 thereof relative to the tracked position 134 of the coupler 16.

Figure 7:
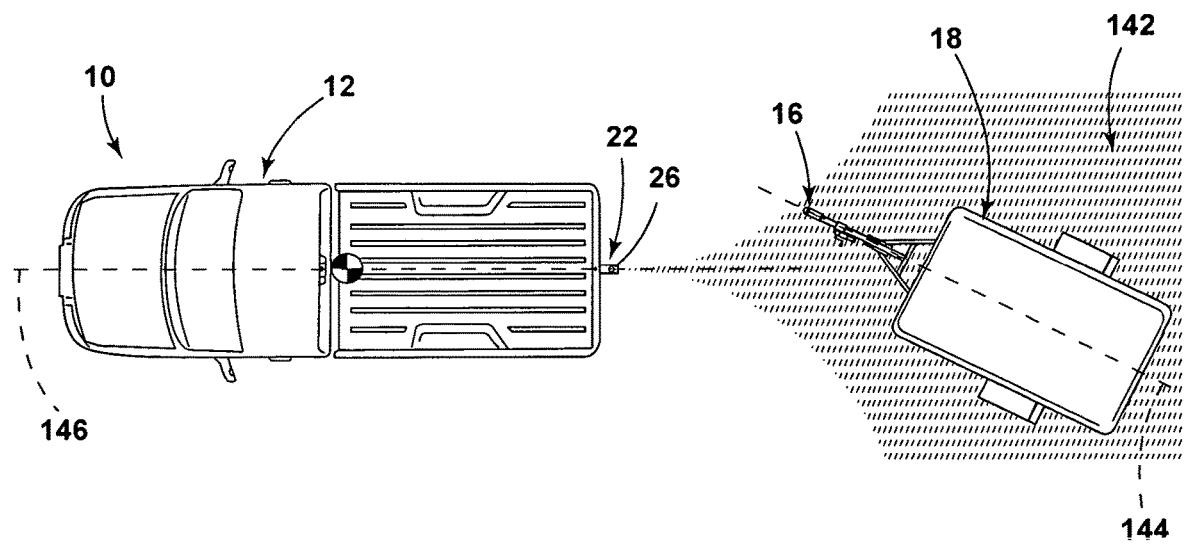
FIG. 7 is an overhead schematic view of the vehicle separated from the trailer, according to some examples, with the trailer and the coupler disposed within a movement region of the vehicle.
Figure 8:
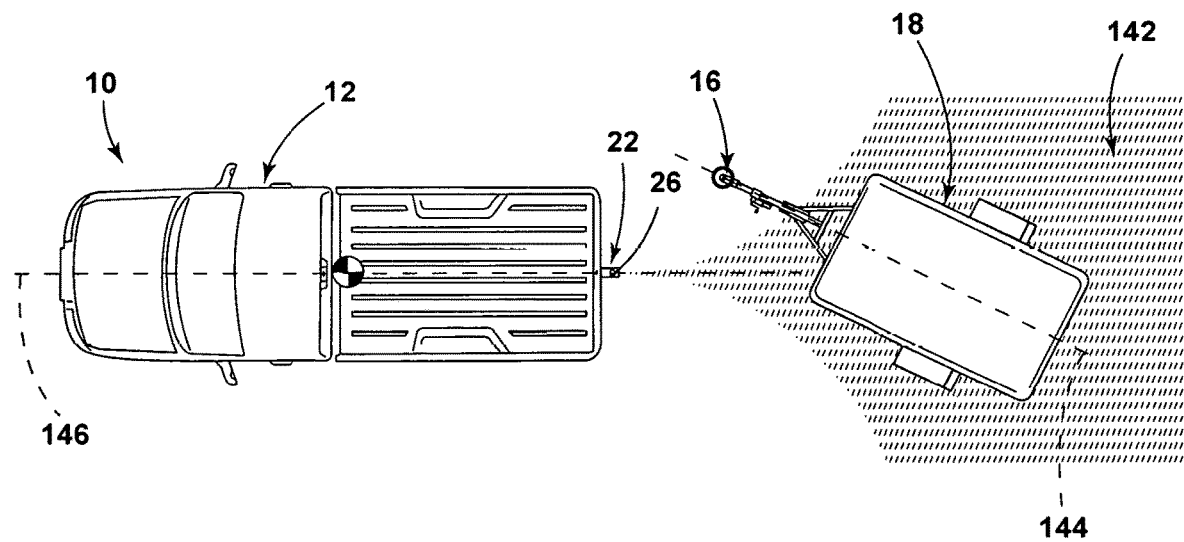
FIG. 8 is an overhead schematic view of the vehicle separated from the trailer, according to some examples, with the coupler disposed outwardly of the movement region of the vehicle.

Referring to FIGS. 7 and 8, the vehicle 12 may detect the trailer 18 based on information provided by the sensing system 46 (FIG. 2), the positioning system 66 (FIG. 2), or a combination thereof, for example. In some instances, the controller 14 (FIG. 2) may generate a movement region 142, which originates from the hitch assembly 22 and projects rearwardly therefrom. The movement region 142 is defined by the maximum steering angle of the vehicle 12 while moving rearwardly. As exemplarily illustrated in FIGS. 7 and 8, a heading direction of the trailer 18, which may be defined by a longitudinal axis 144 of the trailer 18, may be offset from a heading direction of the vehicle 12, which may be defined by the longitudinal axis 146 of the vehicle 12.

In some examples, as generally illustrated in FIG. 7, the vehicle 12 may be capable of aligning the hitch assembly 22 with the coupler 16 through rearward motion of the vehicle 12 when the coupler 16 is disposed within the movement region 142. In other instances, such as the example illustrated in FIG. 8, the trailer 18 may be disposed within the movement region 142, but the coupler 16 may be disposed outwards of the movement region 142, making alignment of the hitch assembly 22 and the coupler 16 not possible without additional corrections, such as forward movement of the vehicle 12. Moreover, in some instances, even when the trailer-heading direction is offset from the vehicle heading direction and the vehicle 12 is moved along the vehicle backup path 20, the steering system of the vehicle 12 may undergo abrupt and/or quick changes in steering angle, potentially causing adverse conditions on a user U. Moreover, in some instances, the coupler 16 may move from a position within the movement region 142 to a position outwardly of the movement region 142 as the vehicle 12 maneuvers along the vehicle path 20. To mitigate these potential issues, and/or any other issue, the hitch assist system 10 may detect and/or track the trailer 18 as a whole until the coupler 16 may be detected.

Based on the detection and tracking of the trailer 18, the controller 14 may predict a heading direction of the trailer 18, which may be used to determine the initial endpoint 132 and/or the final endpoint 140 of the path 20. For example, if the trailer 18 is offset to face slightly right of the vehicle heading direction, as illustrated in FIGS. 7 and 8, the vehicle 12 may maneuver slightly right of the center of the trailer 18, expecting the coupler 16 to be proximate to this position. In instances in which the heading direction of the trailer 18 may be undetectable, the hitch assist system 10 may assume the heading direction of the trailer 18 is common with the heading direction of the vehicle 12. However, it will be appreciated that in such instances, any other predefined relationship may be used without departing from the teachings of the present disclosure. Moreover, as will be described in greater detail below, one or more imagers 38, 40, 42, 44 (FIG. 2) may be used in conjunction with image process operations (within the image/signal processing routine 58) while the vehicle 12 is maneuvered along the path 20 and initiate a search for a coupler 16 at or before the trailer 18 is within the field of view of the one or more imagers 38, 40, 42, 44 such that a heading direction of the trailer 18 relative the vehicle 12 may be determined at one of the earliest possible moments.

Figure 9:
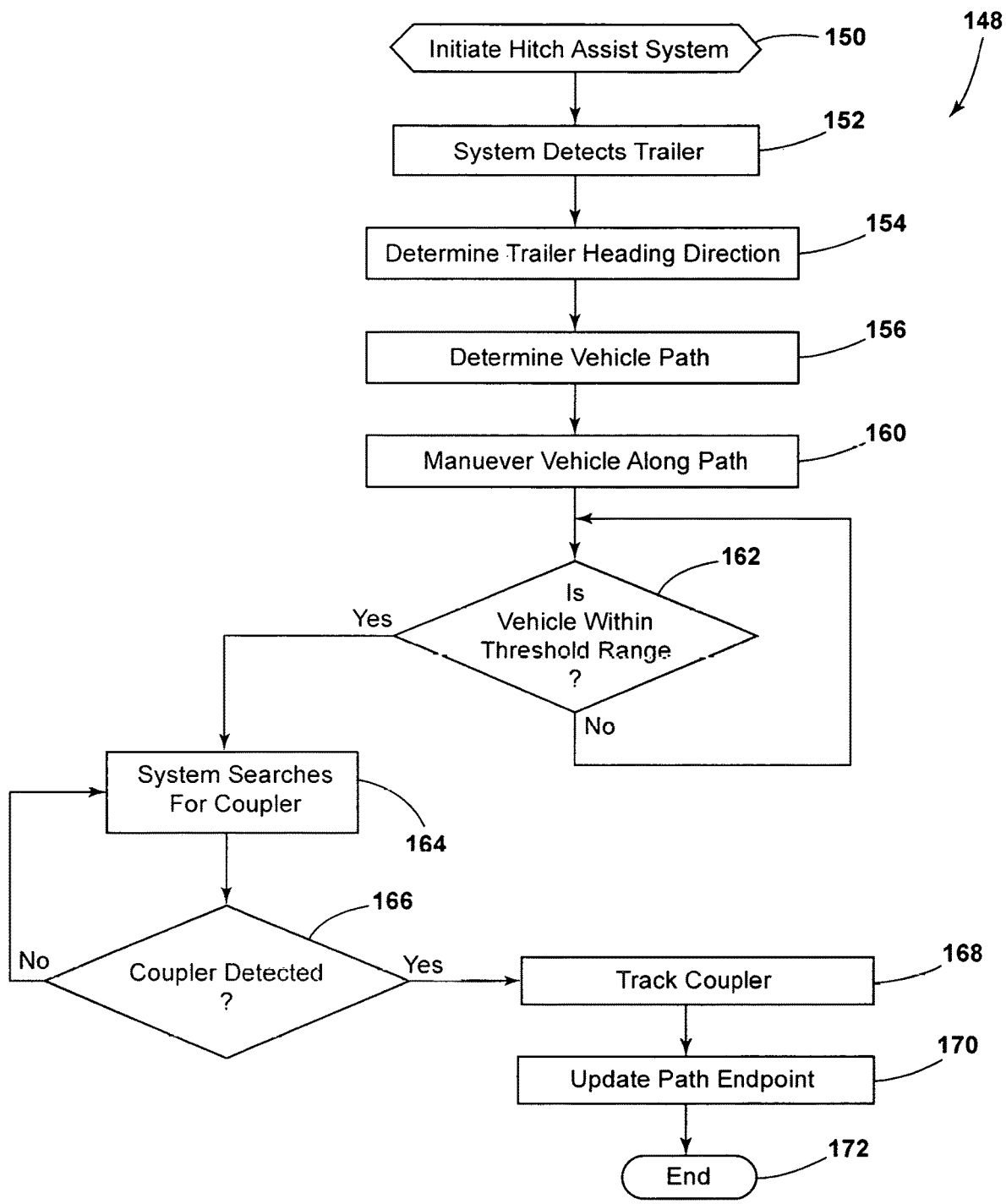
FIG. 9 is a flowchart of an operating routine of the hitch assist system for determining a trailer-heading direction, according to some examples.

Referring to FIG. 9, an operating routine 148 of aligning the hitch assembly 22 with the coupler 16 while considering the vehicle heading direction and/or the trailer-heading direction is shown, according to some examples. In particular, at step 150, the hitch assist system 10 is initiated. Upon initiation of the hitch assist system 10, the routine 148 continues to step 152 where a trailer 18 is detected proximate the vehicle 12 using data from the sensing system 46, which may include the available image data 56 and using the image/signal processing routine 58. Additionally and/or alternatively, one or more sensors may provide signal responses to the controller 14 that may be used within a signal processing routine to detect the trailer 18. In some instances, the user U (such as by way of the HMI 114) may confirm the coupler 16.

Figure 10:
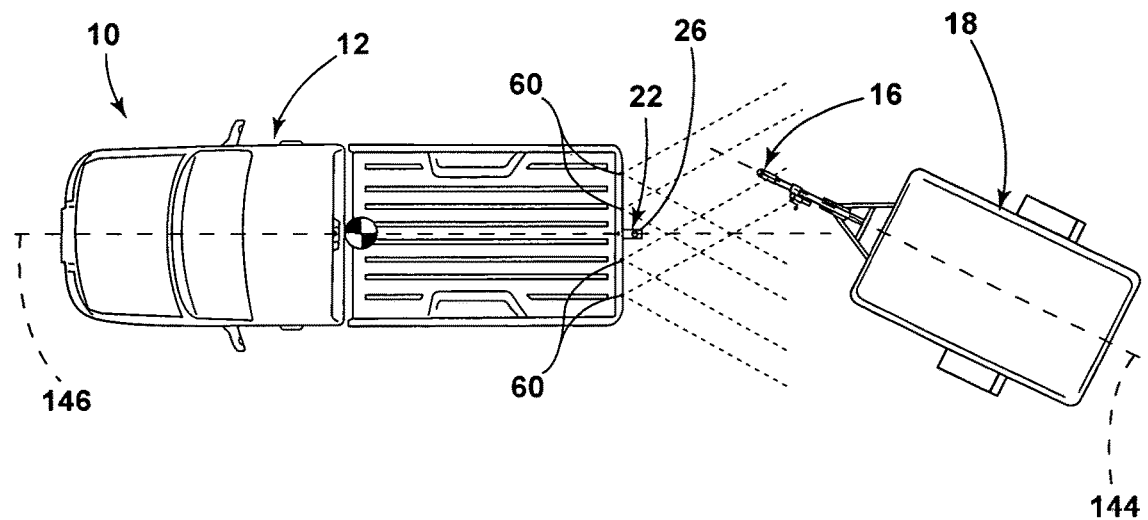
FIG. 10 is an overhead schematic view of the vehicle separated from the trailer with the trailer-heading direction offset from the vehicle in a first direction, according to some examples.
Figure 11:
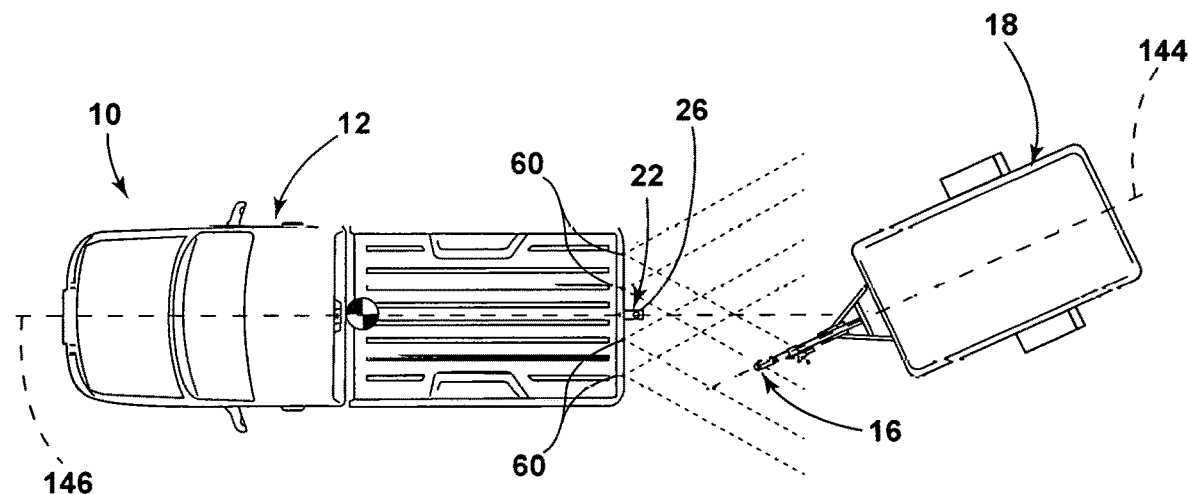
FIG. 11 is an overhead schematic view of the vehicle separated from the trailer with the trailer-heading direction offset from the vehicle in a second direction, according to some examples.

Next, at step 154, the hitch assist determines the trailer-heading direction. As exemplarily illustrated in FIGS. 10 and 11, the trailer 18 may be offset from the vehicle heading direction in a rightward or a leftward direction. It will be appreciated that the trailer-heading direction may be calculated relative to the hitch assembly 22, the vehicle heading direction of the vehicle 12, and/or any other coordinate system. In some instances, one or more proximity sensors on the vehicle 12 may be utilized for determining the heading direction of the vehicle 12, such as radar sensors 60 that can operate successfully through most snow, rain or dust without substantial effect because the wavelength is longer than the obscurant particles to detect the trailer 18 and/or the coupler 16. The proximity sensors may also be used to detect other various objects proximate the vehicle 12 during operation of the hitch assist system 10 prior to and/or during any hitch assist operations. It will be appreciated that any other sensor capable of providing information to the hitch assist system 10 to determine the trailer-heading direction may be used in conjunction with or in lieu of the radar sensor 60. Imagers 38, 40, 42, 44 may be used in addition to and/or in lieu of the proximity sensors. In some instances, the trailer-heading direction may be unobtainable for a period along the path 20. In such instances, a nominal trailer-heading direction may be used as the heading direction. For example, the nominal heading direction may be 0 degrees relative to the vehicle 12. However, it will be appreciated that the nominal trailer-heading direction may be any other angle without departing from the scope of the present disclosure.

Figure 12:
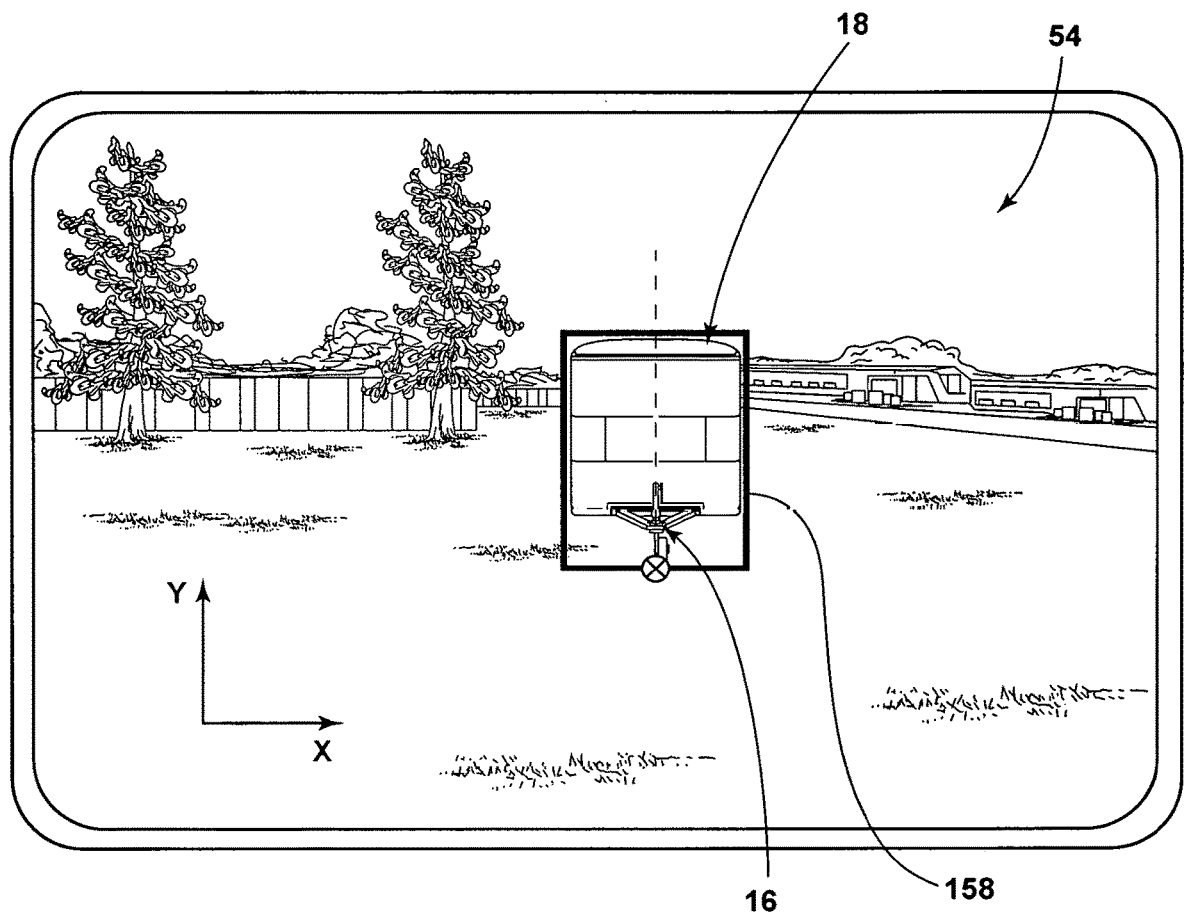
FIG. 12 is an exemplary image patch illustrating a front portion of the trailer and a boundary surrounding the trailer, according to some examples.

At step 156, the imager 38, 40, 42, 44 in conjunction with the image/signal processing routine 58 may track the detected trailer 18 and define a boundary 158 surrounding the trailer 18 in the image patch 54, as exemplarily illustrated in FIG. 12. The boundary 158 may surround a detected outer periphery of the trailer 18. In order to determine the initial endpoint 132 and/or the final endpoint 140 of the vehicle path 20, the hitch assist system 10 determines a point within the boundary 158 to align the hitch assembly 22 with the coupler 16.

The initial endpoint 132 and/or the final endpoint 140 is segmented into an x-value, which may correspond to a vehicle side-to-side direction, and a y-value, which may correspond to a vehicle vertical, or height, direction. In some instances, the y-value of the initial endpoint 132 and/or the final endpoint 140 may be at a value that is along the base of the boundary 158 as the vehicle 12 is targeting the projection of the coupler 16 on a two-dimensional plane relative the ground, as illustrated in FIG. 12. If the heading direction of the trailer 18 relative the vehicle 12 is determined to be 0 degrees and/or a trailer-heading direction is unobtainable, the x-value is determined as the central point along the base of the boundary 158.

Figure 13:
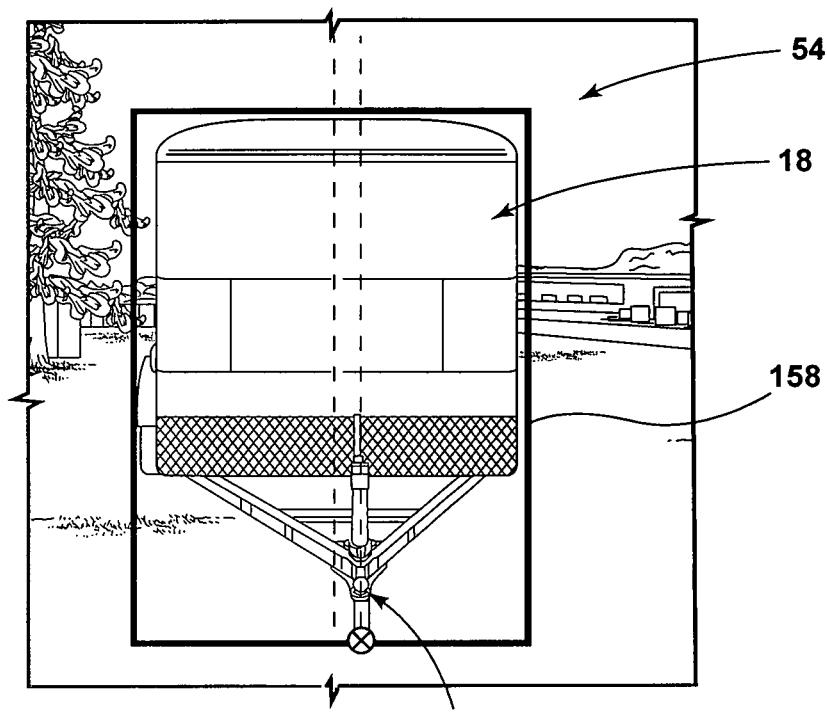
FIG. 13 is an exemplary image patch illustrating a front portion of the trailer and a boundary surrounding the trailer with the trailer offset from a centerline of the boundary, according to some examples.
Figure 14:
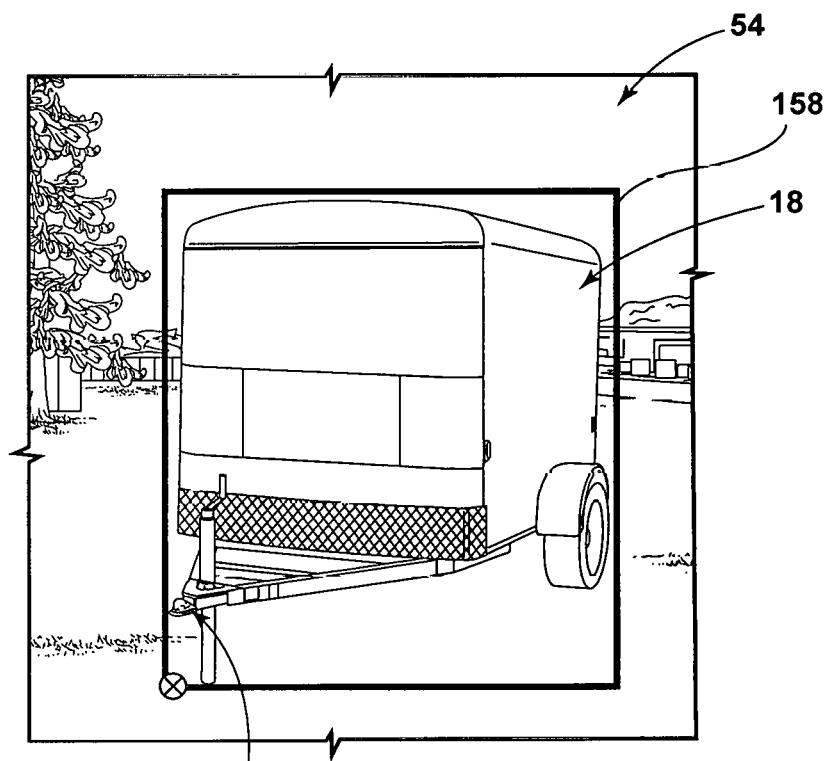
FIG. 14 is an exemplary image patch illustrating a front portion of the trailer and a boundary surrounding the trailer with the trailer offset from the centerline of the boundary, according to some examples.
Figure 15:
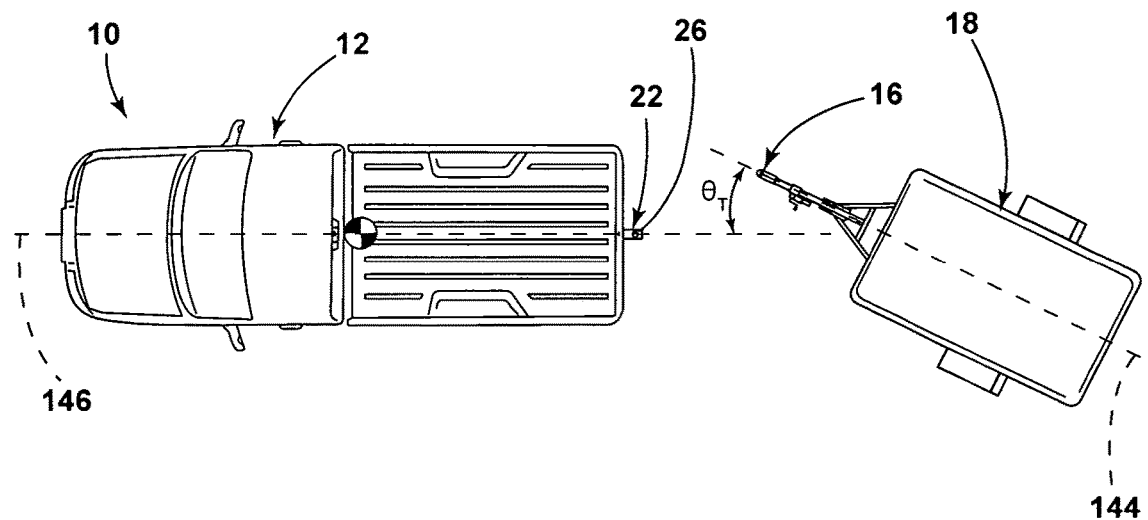
FIG. 15 is an overhead schematic view of the vehicle separated from the trailer with the trailer-heading direction offset from the vehicle in a first direction, according to some examples.
Figure 16:
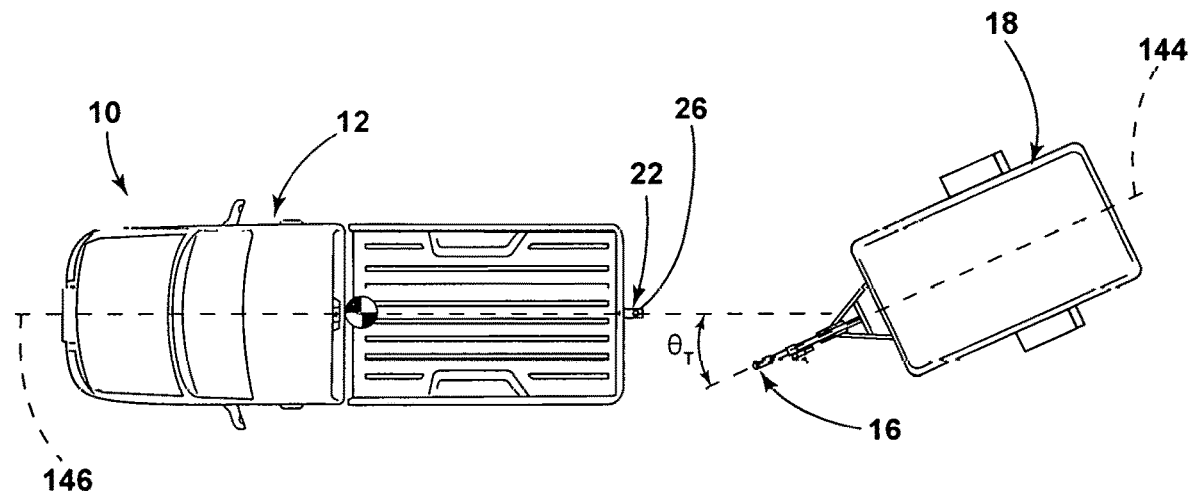
FIG. 16 is an overhead schematic view of the vehicle separated from the trailer with the trailer-heading direction offset from the vehicle in a second direction, according to some examples.

If the trailer-heading direction is offset from the vehicle heading direction (e.g., the angle of the trailer-heading direction relative the heading direction of the vehicle is ±0 degrees), the x-value may be offset from the central point along the base of the boundary 158 as illustrated in FIGS. 13 and 14. In some instances, the position of the x-value may be calculated as a percentage from the centerline based on the offset. In some instances, a standard set of trailer architectures may be used to develop a lookup table for the x-value. In some implementations, the x-value offset from the centerline may be calculated as a percentage along the base of the boundary 158 that is 1.5 times the relative angle between the vehicle heading direction and the trailer-heading direction. For example, a trailer 18 with a relative heading direction of +5 degrees may have an offset from the central point of +7.5%. Further, a relative heading angle of the trailer 18 relative the vehicle 12 of −8 degrees may correlate to an offset of −12%, in some examples. However, it will be appreciated that any relational formula may be used and/or stored within the lookup table for calculating the x-value based on the offset of the trailer-heading direction relative the vehicle heading direction.

In some instances, as illustrated in FIG. 14, the trailer-heading direction may be above a predefined threshold angle (e.g., ±25 degrees). In such instances, the x-value may be determined at the outer corner of the boundary 158. Accordingly, the estimated initial endpoint 132 and/or final endpoint 140 within the boundary 158 may be defined by a lower corner of the boundary 158.

Referring back to FIG. 9, once the offset between the vehicle 12 and the trailer 18 is determined at step 154, the path derivation routine 128 can be used to determine the vehicle path 20 to align the hitch ball 26 with the coupler 16 at step 160. In this manner, the controller 14 uses the path derivation routine 128 to determine the path 20 to align the hitch assembly 22 with the initial endpoint 132 and/or the final endpoint 140. Once the path 20 has been derived, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation. When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the speed of vehicle 12 using the powertrain control system 98 and the braking control system 96.

While the vehicle 12 is maneuvered along the path 20, an offset distance between the hitch assembly 22 and the coupler 16 is monitored. In some examples, the hitch assist system 10 may store a threshold range between the hitch assembly 22 and the coupler 16 at which there is a possibility for detecting the actual position of the coupler 16. For example, the detection distance may be from about 1 m and 5 m, or from about 2 and 4 meters, or from about 2 and 3 meters, or any and all values and ranges therebetween, or any other distance larger than 5 meters. The threshold range may be a value larger than, for example 5% above, the detection distance such that the sensing system 46 begins to search for the coupler 16 prior to and/or at the time at which the coupler 16 may be detectable. As the sensing system 46 begins to search for the coupler 16 when the vehicle 12 approaches the threshold range, at step 162, the hitch assist system 10 may have the maximum amount of time travel distance to adopt the updated trailer coupler 16 coordinates as the vehicle 12 maneuvers along the path 20.

At step 164, the hitch assist system 10, through the sensing system 46, may search for the coupler 16. Once the coupler 16 is detected by the vision-processing algorithm, at step 166, the hitch assist system 10 ceases searching for the coupler 16 and begins tracking the detected coupler 16 at step 168, Due to the initial predicted position of the coupler 16 within the trailer boundary 158, the likelihood of the coupler 16 being detected by the sensing system 46 may be increased, as the search is more localized and more accurate. Additionally, as the vehicle 12 is maneuvered based on the predicted position of the coupler 16, the vehicle 12 may be in a more aligned position with the coupler 16 and/or trailer 18 as the vehicle 12 reaches the threshold range.

At step 170, the final endpoint 140 may be updated based on the vision-processing algorithm's detection of the position of the coupler 16. The endpoint 140 may be updated at any desired frequency during utilization of the hitch assists system. The vehicle 12 continues to update and maneuver along the path 20 to align the hitch assembly 22 with the coupler 16 at which point the method ends at step 172.

Referring to FIGS. 15-20, in some examples, if the trailer-heading direction relative the vehicle 12 is greater than the threshold angle $\theta_T$, the system may end and/or pause hitch assist operations and alert the user U through the vehicle 12 notification system. Such a pause in hitch assist operations may occur to create a possibly more accurate alignment between the hitch assembly 22 and the coupler 16 as the vehicle sensing system 46 may be less accurate at angles greater than the threshold angle $\theta_T$. Moreover, the pause may occur as a large trailer-heading direction angle relative the vehicle 12 may also cause a risk of trailer jackknifing, a potential contact event between the trailer 18 and an object proximate the trailer 18, and/or a corner contact between the trailer 18 and the vehicle 12.

Figure 17:
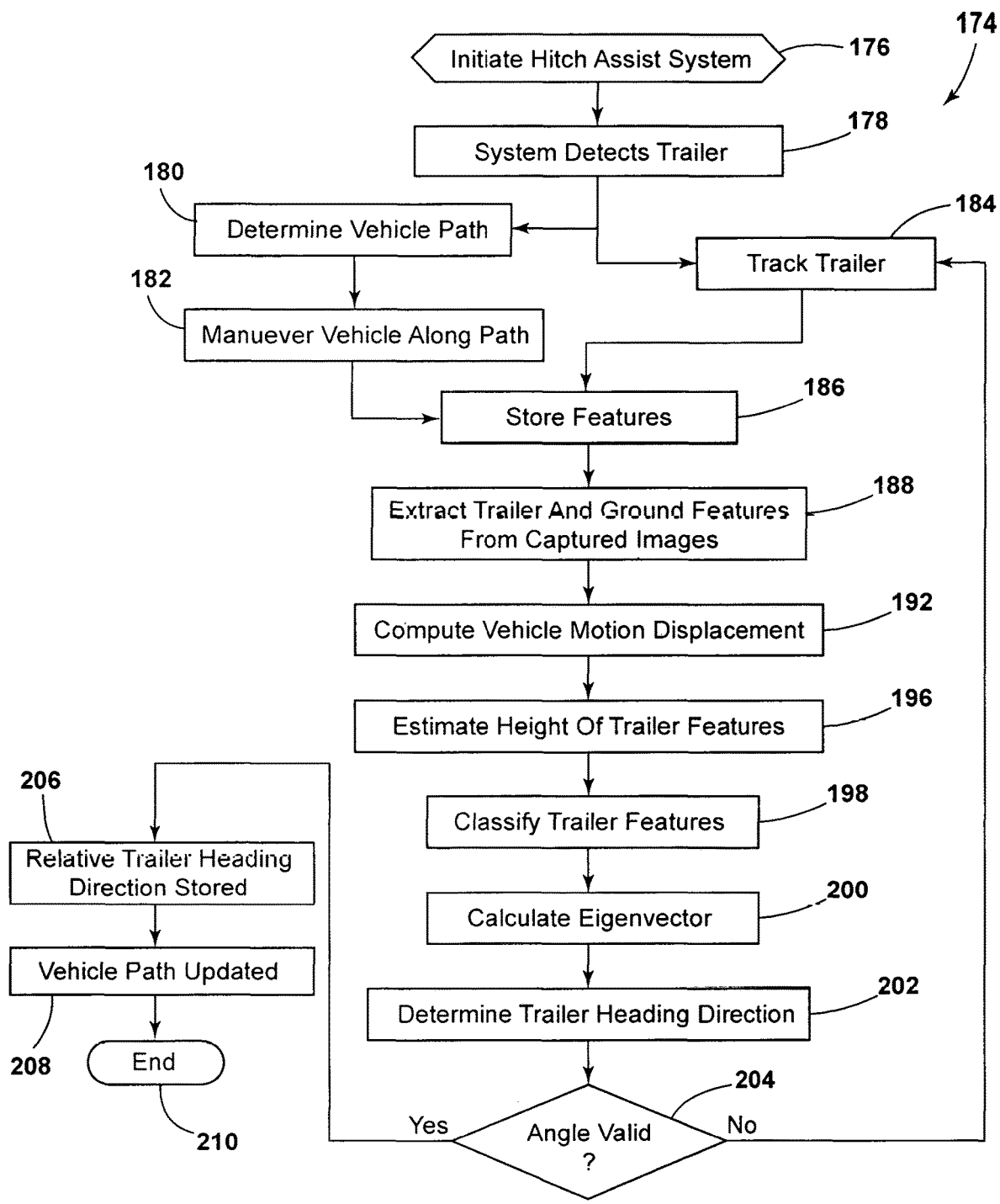
FIG. 17 is a flowchart of an operating routine of the hitch assist system for determining a trailer-heading direction, according to some examples.
Figure 18:
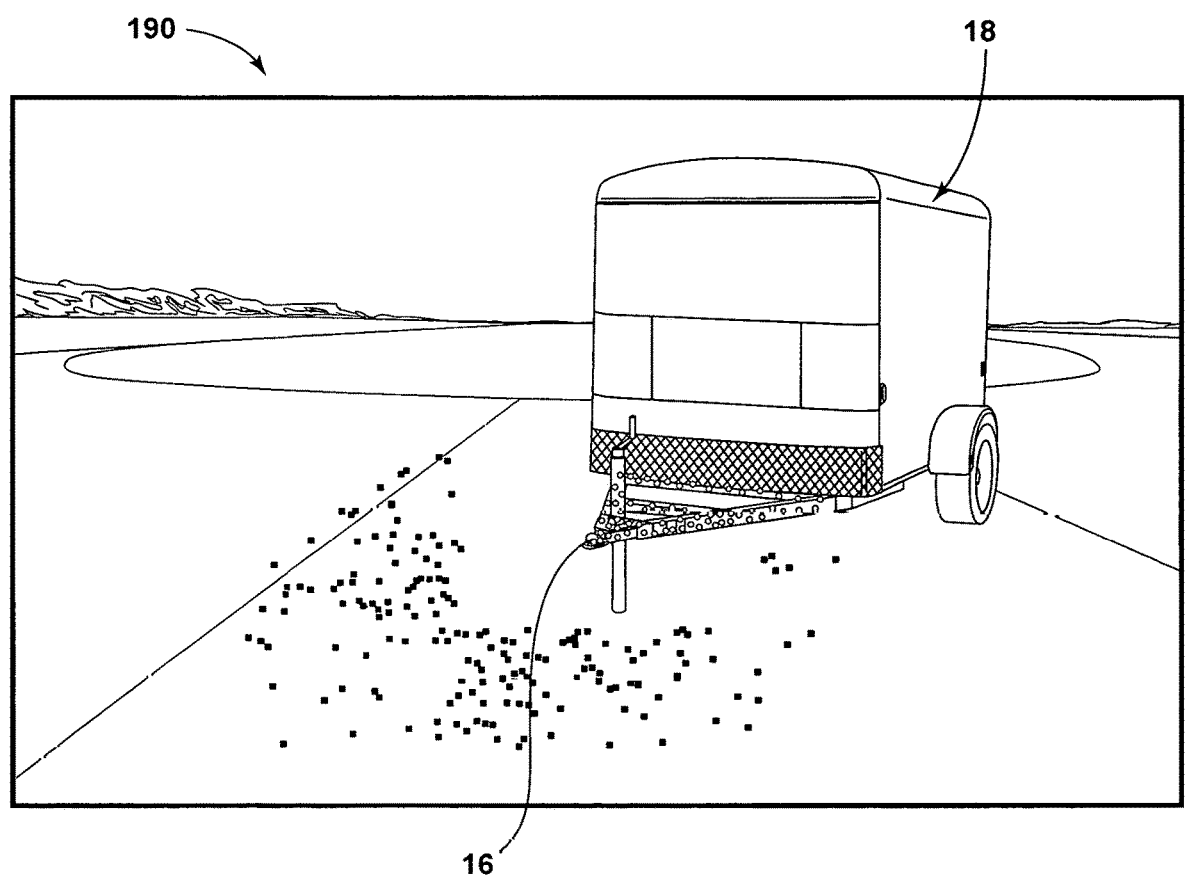
FIG. 18 represents a captured image in which ground and trailer are extracted by a controller from a sparse representation model.
Figure 19:
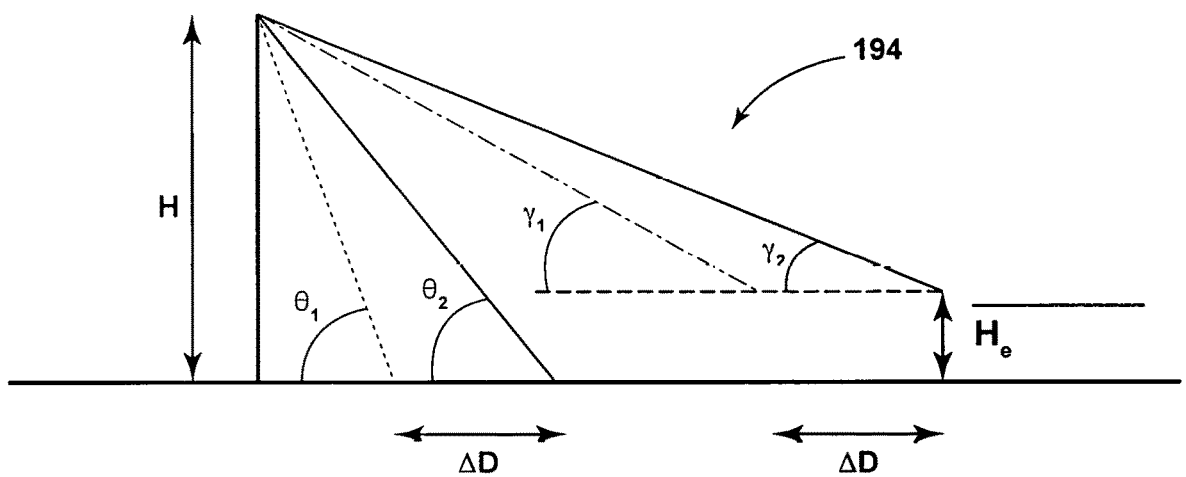
FIG. 19 illustrates a model used to compute vehicle motion displacement.
Figure 20:
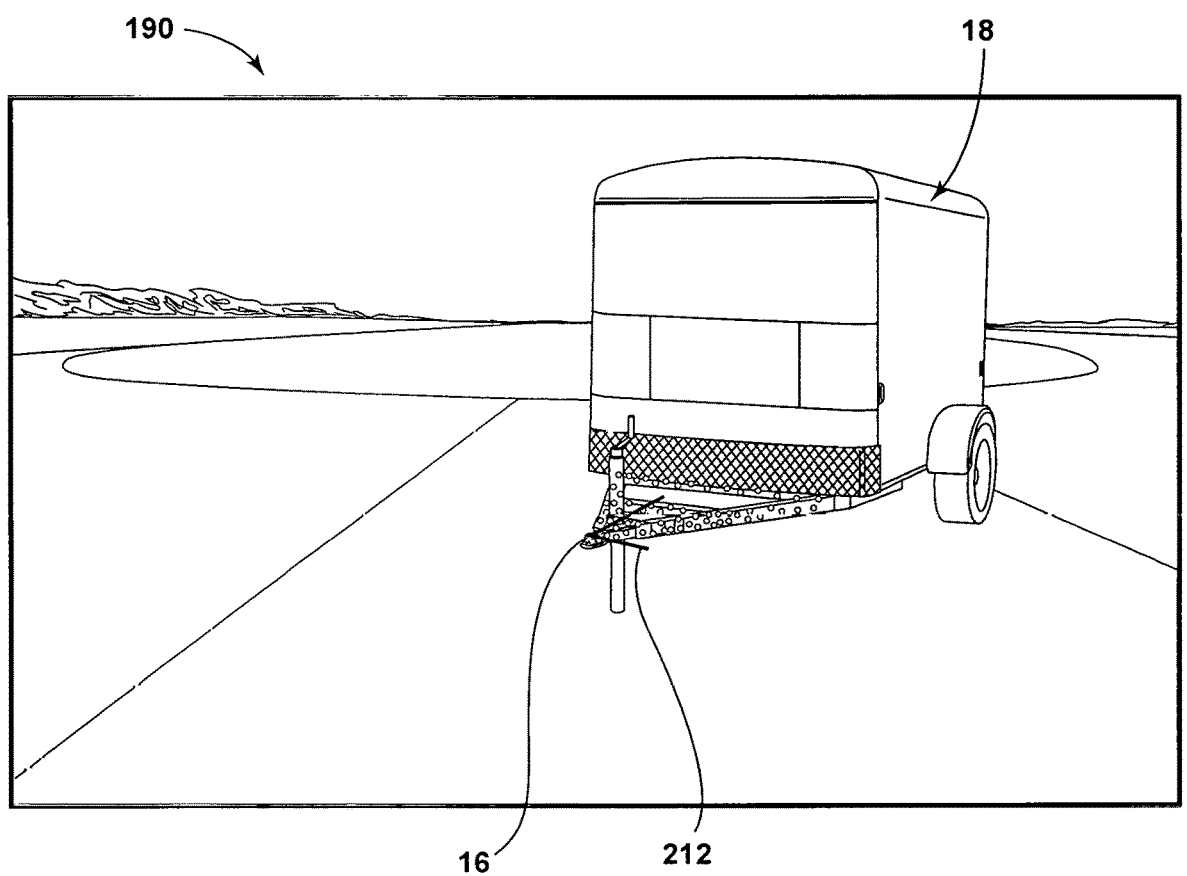
FIG. 20 illustrates an eigenvector calculated from trailer features that may be used to determine the trailer-heading direction.

Referring further to FIG. 17, an operating routine 174 of aligning the hitch assembly 22 with the coupler 16 while considering the vehicle heading direction and/or the trailer-heading direction is shown, according to some examples. In particular, at step 176, the hitch assist system 10 is initiated. Upon initiation of the hitch assist system 10, the routine 174 continues to step 178 where the trailer 18 is detected using data from the sensing system 46, which may include the available image data 56 and using the image/signal processing routine 58. Additionally and/or alternatively, one or more sensors may be used to detect the trailer 18. In some instances, the user U (such as by way of the HMI 114) may confirm the coupler 16.

Once the trailer 18 is detected at step 178, the path derivation routine 128 can be used to determine the vehicle path 20 to align the hitch ball 26 with the coupler 16 at step 180. In this manner, the controller 14 uses the path derivation routine 128 to determine the path 20 to align the hitch ball 26 with the coupler 16 in an overlapping position over hitch ball 26. Once the path 20 has been derived, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation. When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the speed of vehicle 12 using the powertrain control system 98 and the braking control system 96.

While the vehicle 12 is maneuvered along the path 20 at step 182, the hitch assist system 10 continues to track the trailer 18 at step 184. As the vehicle 12 approaches the trailer 18, the image data provided by the one or more imagers 38, 40, 42, 44 to the vision-processing algorithm detects one or more features. These features may be points of interest in the image patch 54 that may be robustly detected through sequential frames due to their distinguishability from other points within the image. As provided herein, the features may be edge intersections, line endings, and/or local intensity maximums or minimums, each of which may be disposed on any portion of the trailer 18. At step 186, the features are collected and tracked.

At step 188, the controller 14 (e.g., microprocessor 124) analyzes the captured images and extracts trailer features and ground features therefrom. Trailer features may be any detected point within the image patch 54 that may be disposed on the trailer 18. Ground features may be any detected point within the image patch 54 that are likely to be on a ground surface surrounding the trailer 18. For example, as shown in the captured image 190 of FIG. 18, trailer features are generally represented by circles and ground features are generally represented by squares. The trailer and ground features may be extracted by the controller 14 from a sparse representation model, although a dense representation model is also contemplated. In extracting the trailer and ground features, the controller 14 may employ any suitable image processing technique such as, but not limited to, edge detection. In certain embodiments, the controller 14 may perform additional processing on trailer features extracted at step 188 to distinguish between trailer features more, likely to be located on the trailer 18 and those less likely to be located on the trailer 18. In doing so, the controller 14 may focus on trailer features located proximate to the detected trailer 18. Thus, with respect to examples where the controller 14 classifies trailer features as either on-trailer or off-trailer, it will be appreciated that the trailer features extracted from the captured image at step 188 generally serve as potential trailer features. By further scrutinizing these potential trailer features, an increase in trailer detection accuracy can be achieved.

At step 192, the controller 14 computes a displacement of the vehicle 12, the displacement referred to herein as vehicle motion displacement. For example, computation of vehicle motion displacement may be based on a model 194 shown in FIG. 19. Referring thereto, the vehicle motion displacement $\Delta D$ is computed by solving the following equation:

$$\Delta D = \frac{H}{\tan\theta_2} - \frac{H}{\tan\theta_1} \quad (3)$$

where H is a known height of the imager 40, and $\theta_1$ and $\theta_2$ are derived from optical flow of the ground features.

At step 196, the controller 14 estimates a height of each trailer feature. For example, the height of each trailer feature may be estimated by solving the following equation:

$$\Delta D = \frac{H - H_e}{\tan\gamma_2} - \frac{H - H_e}{\tan\gamma_1} \quad (4)$$

where $H_e$ is the estimated height of a given trailer feature, $\Delta D$ is the vehicle motion displacement computed at step 192, H is the known height of the imager 40, and $\gamma_1$ and $\gamma_2$ are derived from optical flow of the trailer features.

At step 198, the controller 14 can classify the trailer features by thresholding the estimated heights. That is, trailer features having estimated heights at or above a certain threshold may be classified as on-trailer whereas trailer features having estimated heights below the threshold may be classified as off-trailer.

At step 200, trailer features of the image patch 54 are computed to form a local covariance matrix and at least one eigenvector 212 (FIG. 20) of the local covariance matrix is calculated. The covariance matrix has matrix elements that depend on differences between trailer features of positions that are spaced apart in separate directions. Notably, the matrix elements of the covariance matrix depend on products of components of a local gradient field of the trailer features. The eigenvector 212 represents the dominant direction of an image structure, which is present in the part of the image patch 54 from which the trailer features are taken as exemplarily illustrated in FIG. 20. The computation of one or more eigenvectors 212 can be carried out through any method known in the art. In some examples, for diagonalisation of a three-dimensional or a four-dimensional covariance matrix, the Jacobi method may be used.

An eigenvalue relating to the eigenvector 212 of the local covariance matrix represents an amount of structure along the direction of the image patch 54, which corresponds to the eigenvector 212. When in a two-dimensional image patch 54, one eigenvalue is much larger than the other eigenvalue, and then there is an image structure along the direction relating to the eigenvector 212 associated with the large eigenvalue. As an eigenvalue is larger, the corresponding image structure is more strongly correlated along the direction of the associated eigenvector 212. When the eigenvalue does not differ much, there is hardly any directional structure in the image. Because the image processing involves the eigenvalues of the covariance matrix, the amount of directionality of image structures is taken into account. The more directional correlation, as indicated by one or more relatively large eigenvalues, the less probable such a structure is caused by noise or perturbations. In some instances, the processed trailer features are derived from weighted averages of differences between trailer features of the image, the weighted average involving weights depending on one or several eigenvalues of the local covariance matrix. The weights are associated with the probability that a local dominant direction has arisen by chance from either noise or randomly distributed perturbations or from a local dominant direction, which is associated with an image structure of a relevant detail in the image patch 54. As the points selected and filtered by the hitch assist system 10 have a likelihood of being points on the coupler 16, the eigenvector 212 based on the points may designate a trailer-heading direction at step 202.

Referring back to FIG. 17, at step 204, the system determines if the trailer-heading angle based detected by the hitch assist system 10 is valid. If the trailer-heading angle is not valid, the method returns to step 184. The trailer-heading angle may not be valid for a wide array of reasons, including but not limited to, the relative distance between the trailer 18 and the vehicle 12 is above a threshold distance; multiple measurements of the trailer-heading angle vary too widely (i.e., variance is greater than an error threshold); and/or the minimum number of tracked features has not been obtained: If the trailer-heading direction is valid, the method continues to step 206, where the relative trailer-heading angle is stored and used to determine an updated final endpoint 140 for the vehicle path 20.

At step 208, the vehicle path 20 is updated based on the relative trailer-heading direction stored. The vehicle 12 continues to move along the updated vehicle path 20 until the hitch assembly 22 and the coupler 16 are determined to be aligned, and/or user U intervention interrupts the routine 174, at which point the method ends at step 210.

A variety of advantages may be derived from the use of the present disclosure. For example, use of the disclosed hitch assist system provides a system for determining a trailer-heading direction. The trailer-heading direction may provide a more accurate alignment between the vehicle and the trailer when the hitch assembly and the coupler are vertically aligned with one another. Alignment of the vehicle heading direction with the trailer-heading direction may also assist in the mitigation of unwanted circumstances, such as potential jackknifing conditions and/or a touch event between the vehicle and the trailer. Moreover, the hitch assist system may use a first sensor when the vehicle is disposed outwardly of a threshold range and an imager once the vehicle is within the threshold range from the trailer. The imager may use various techniques, such as utilization of eigenvectors, to further determine the trailer-heading direction relative to the vehicle.

According to various examples, a hitch assist system is provided herein. The hitch assist system includes a sensing system configured to detect a trailer proximate a vehicle. The hitch assist system further includes a controller detecting a coupler of the trailer; determining a trailer-heading direction based on the coupler orientation; and determining a path for aligning a hitch assembly on the vehicle with the coupler on the trailer based on the trailer-heading direction. Examples of the hitch assist system can include any one or a combination of the following features:

- the trailer-heading direction is based on a longitudinal axis of the trailer and the trailer-heading direction is determined from one or more features extracted from a forward portion of the trailer;
- the controller is configured to create a boundary encompassing the trailer and an endpoint of the path is disposed on a perimeter of the boundary;
- the endpoint is disposed on a bottom corner of the boundary when the trailer-heading direction is greater than a threshold angle;
- a notification is provided to a user when the trailer-heading direction relative a vehicle heading direction is greater than a threshold angle;
- the controller is further configured to classify each trailer feature as on-trailer or off-trailer by thresholding an estimated height thereof;
- the controller determines the trailer-heading direction based on an eigenvector of the trailer features classified as on trailer;
- the sensing system is configured to detect a distance between the vehicle and the trailer when the vehicle is disposed outwardly of a threshold range and utilizes an imager to determine trailer-heading direction when the vehicle is within the threshold range;
- the vehicle is moved along a path prior to an imager detecting the coupler; and/or
- a first sensor is used to determine a first vehicle path and an imager is utilized to determine a second, updated path.

Moreover, a method of estimating a trailer orientation is provided herein. The method includes capturing rear-vehicle images. The method also includes extracting trailer and ground features from the captured images. The method further includes computing vehicle motion displacement based on optical flow of the ground features. The method additionally includes estimating a height of each trailer feature based on vehicle motion displacement and optical flow of the trailer features. Lastly, the method includes determining a trailer-heading direction based on at least a portion of the trailer features. Examples of the method can include any one or a combination of the following features:

- predicting a trailer-heading direction within a boundary surrounding the trailer when the vehicle is disposed outwardly of a threshold range;
- providing a notification when an angle between a vehicle heading direction and the trailer-heading direction is greater than a threshold angle; and/or
- pausing vehicle motion when a coupler is disposed outward of a movement region.

According to some examples, a hitch assist system is provided herein. The hitch assist system includes an imager for capturing rear-vehicle images. The hitch assist system further includes a controller configured to extract ground features and potential trailer features from the captured images; compute vehicle motion displacement based on optical flow of the ground features; estimate a height of each potential trailer feature based on vehicle motion displacement and optical flow of the potential trailer features; classify the potential trailer features as on-trailer or off-trailer; and determine a final trailer-heading direction of a trailer based on the potential trailer features classified as on-trailer. Examples of the hitch assist system can include any one or a combination of the following features:

- computation of vehicle motion displacement is further based on a known height of the imager;
- a proximity sensor providing sensor signals to the controller for determining an initial trailer-heading direction when the vehicle is disposed outwardly of a threshold range;
- the initial trailer-heading direction determines an initial vehicle path;
- the final trailer-heading direction determines a final vehicle path; and/or
- an eigenvector of the trailer features is calculated to determine the trailer-heading direction.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system comprising:
a sensing system configured to detect a trailer proximate a vehicle; and
a controller for:
detecting a coupler of the trailer;
determining a coupler orientation;
determining a trailer-heading direction based on the coupler orientation; and
determining a path for aligning a hitch assembly on the vehicle with the coupler on the trailer based on the trailer-heading direction, wherein the trailer-heading direction is based on a longitudinal axis of the trailer and the trailer-heading direction is determined from one or more features extracted from a forward portion of the trailer, and wherein the controller is configured to create a boundary encompassing the trailer and an endpoint of the path is disposed on a perimeter of the boundary.

2. The hitch assist system of claim 1, wherein the endpoint is disposed on a bottom corner of the boundary when the trailer-heading direction is greater than a threshold angle.

3. The hitch assist system of claim 1, wherein a notification is provided to a user when the trailer-heading direction relative a vehicle heading direction is greater than a threshold angle.

4. The hitch assist system of claim 1, wherein the controller is further configured to classify each trailer feature as on-trailer or off-trailer by thresholding an estimated height thereof.

5. The hitch assist system of claim 4, wherein the controller determines the trailer-heading direction based on an eigenvector of the trailer features classified as on-trailer.

6. The hitch assist system of claim 1, wherein the sensing system is configured to detect a distance between the vehicle and the trailer when the vehicle is disposed outwardly of a threshold range and utilizes an imager to determine trailer-heading direction when the vehicle is within the threshold range.

7. The hitch assist system of claim 1, wherein the vehicle is moved along a path prior to an imager detecting the coupler.

8. The hitch assist system of claim 1, wherein a first sensor is used to determine a first vehicle path and an imager is utilized to determine a second, updated path.

9. A hitch assist system comprising:
an imager for capturing rear-vehicle images; and
a controller configured to:
extract ground features and potential trailer features from the captured images;
compute vehicle motion displacement based on optical flow of the ground features, wherein computation of vehicle motion displacement is further based on a known height of the imager;
estimate a height of each potential trailer feature based on vehicle motion displacement and optical flow of the potential trailer features;
classify the potential trailer features as on-trailer or off-trailer; and
determine a final trailer-heading direction of a trailer based on the potential trailer features classified as on-trailer.

10. The hitch assist system of claim 9, further comprising:
a proximity sensor providing sensor signals to the controller for determining an initial trailer-heading direction when the vehicle is disposed outwardly of a threshold range.

11. The hitch assist system of claim 10, wherein the initial trailer-heading direction determines an initial vehicle path.

12. The hitch assist system of claim 11, wherein the final trailer-heading direction determines a final vehicle path.

13. A hitch assist system comprising:
an imager for capturing rear-vehicle images; and
a controller configured to:
extract ground features and potential trailer features from the captured images; compute vehicle motion displacement based on optical flow of the ground features;
estimate a height of each potential trailer feature based on vehicle motion displacement and optical flow of the potential trailer features;
classify the potential trailer features as on-trailer or off trailer; and
determine a final trailer-heading direction of a trailer based on the potential trailer features classified as on-trailer, wherein an eigenvector of the trailer features is calculated to determine the trailer-heading direction.

14. A method of estimating a trailer orientation, comprising the steps of:
capturing rear-vehicle images;
extracting trailer and ground features from the captured images;
computing vehicle motion displacement based on optical flow of the ground features;
estimating a height of each trailer feature based on vehicle motion displacement and optical flow of the trailer features;
determining a trailer-heading direction based on at least a portion of the trailer features; and
predicting a trailer-heading direction within a boundary surrounding the trailer when the vehicle is disposed outwardly of a threshold range.

15. The method of estimating a trailer orientation of claim 14, further comprising:
providing a notification when an angle between a vehicle heading direction and the trailer-heading direction is greater than a threshold angle.

16. The method of estimating a trailer orientation of claim 14, further comprising:
pausing vehicle motion when a coupler is disposed outward of a movement region.

* * * * *